July 16, 1968   J. E. CARROLL ET AL   3,393,102
ARC WELDING FLUX
Filed Jan. 15, 1965   2 Sheets-Sheet 1

INVENTORS.
JOHN E. CARROLL &
KENNETH L. BROWN
BY *Tilberry & Body*

ATTORNEYS

July 16, 1968   J. E. CARROLL ET AL   3,393,102
ARC WELDING FLUX

Filed Jan. 15, 1965   2 Sheets-Sheet 2

INVENTORS.
JOHN E. CARROLL &
KENNETH L. BROWN
BY Tilberry & Body
ATTORNEYS

United States Patent Office 3,393,102
Patented July 16, 1968

3,393,102
ARC WELDING FLUX
John E. Carroll, Lyndhurst, and Kenneth L. Brown, South Euclid, Ohio, assignors to The Lincoln Electric Company, Cleveland, Ohio, a corporation of Ohio
Filed Jan. 15, 1965, Ser. No. 425,745
11 Claims. (Cl. 148—26)

ABSTRACT OF THE DISCLOSURE

Submerged arc welding flux wherein silicon dioxide, manganese dioxide and certain emitter oxides are carefully blended to give a high deposition rate. The emitter oxides are the oxides of calcium, magnesium, aluminum, and titanium.

---

This invention pertains to the art of arc welding and more particularly to a granular flux for the submerged or concealed arc welding of steel.

The invention is particularly applicable to the arc welding of the mild, low carbon steels using a small diameter (e.g., 3/32 inch or smaller) consumable steel electrode depositing metal at a rate in excess of 25 pounds per hour and will be described with particular reference thereto, although it will be appreciated that the invention may be used with any size electrode at any deposition rate.

In the art of such submerged arc welding, an electrically energized steel electrode is advanced lengthwise through a pile of granular fluxing material positioned on top of the workpiece to be welded while maintaining an arc between the end of the electrode and the workpiece. The arc both melts a spot on the workpiece to form a pool of molten metal and melts off the end of the electrode to provide a filler metal which mixes with the molten pool on the workpiece. The electrode is simultaneously advanced sidewardly so that as the molten metal left behind congeals, an elongated hardened weld seam results.

The fluxing material conceals the arc, but the flux adjacent to the arc is melted by the heat of the arc and forms a molten coating over both the weld pool to protect it from the atmosphere and the congealing molten metal left behind by the sidewardly advancing electrode. Also, some of the materials in the molten flux may migrate into the weld pool and alloy therewith. A further function of the molten flux discovered as a result of the present invention is to conduct the heat from the arc plasma to the lateral edges of the weld bead.

After the molten metal and flux, now called slag, have congealed, the slag is removed to reveal the weld bead below. One characteristic required of such slag is that it have a freezing temperature below the freezing temperature of the metal in the weld bead so that the surface of the metal as it hardens is in contact with the flux in a liquid state, which flux being lighter than the metal and flowable, floats on the surface thereof and allows the metal surface to assume a shape as though the slag were not present. After the metal hardens, the slag congeals and may be removed.

The condition of the surface of the weld bead is very important and often tells whether or not a good or poor weld bead has been laid down. Thus, the surface must be free of blow holes or porosity and should be as smooth as possible. In the fillet welding of thick plates, the ideal surface, in transverse cross section, is generally flat to slightly concave with the edges of the weld bead curving or blending smoothly and tangentially into the unmelted surfaces of the workpiece. Any metal in the weld bead above the plane defined by the boundary lines between the molten metal and the unmelted portions of the workpiece contributes nothing to the strength of the weld bead and may thus be said to be wasted. Such a bead, while not necessarily defective, costs more than necessary.

If the edges of the weld bead do not curve or blend smoothly into the unmelted surfaces of the workpiece, stress points can result which might cause early fatigue failure of the weld.

Aside from the need for a good and properly shaped weld bead, the next most important problem in arc welding is to put down such a bead in the shortest possible time. All weld beads require some filler metal and the thicker the workpiece, the more filler metal is required per lineal unit length of bead. For a given thickness of workpiece and shape of weld bead, the lineal speed of welding is thus determined primarily by the meltoff rate (e.g., in pounds per hour) of the electrode.

Efforts have been made for many years to increase this meltoff rate so that the lineal speed of welding can be correspondingly increased and the time to lay down a given length of weld bead decreased.

The electrode meltoff rate is primarily a function of the arc currents and the electrode distance (i.e., distance from the electrode energizing contacts to the electrode tip). Thus, as is taught in U.S. Patent No. 2,444,834 and assigned to the assignee of this application, as the current density in the electrode tip is increased, the meltoff rate first increases as a function of the square of the current until the current reaches a value of approximately 50,000 amperes per square inch. As the current is further increased, the meltoff rate increases approximately as a function of the cube of the current. As is taught in U.S. Patent No. 2,721,249 and likewise assigned, if the stickout distance is increased, the meltoff rate for a given current density can be further increased, particularly at current densities above 50,000 amperes per square inch. In the latter case, the stickout portion of the electrode which has electrical resistance is heated by the currents flowing therethrough and this heating effect can be sufficiently large so as to bring the electrode tip close to the melting temperature of the metal independently of the heat of the arc. Then all the arc has to do is to supply the heat of fusion.

The electrode current for a given diameter of electrode and given stickout distance is primarily a function of the electrode feed down speed so that it would appear that in order to increase the meltoff rate and thus increase the lineal speed of welding, it would simply be necessary to increase the electrode feed down speed with or without an increase in the stickout. Test work using granular welding fluxes available prior to the making of the present invention indicated that this was not so and that whenever the electrode feed down speed was increased beyond a certain amount, depending on the type of power source used, something happened in the arc which resulted in the weld bead having a hump down its center, the size of which increased as the feed down speed (or meltoff rate) increased until a point was reached where the hump was not only excessively high but was quite rough and entirely unacceptable.

As above pointed out, the metal in this hump, even though the bead were otherwise acceptable, does not add to the strength of the weld bead and is thus wasted. Also, it does little good to increase the meltoff rate of the electrode if the increased metal melted off simply piles up and does not result in an increased speed of lineal welding.

Thus, with previously available fluxes, there has been a maximum meltoff rate of the electrode commensurate with obtaining satisfactory weld beads. One test showed that with a 5/64 inch mild steel electrode, a stickout distance of 2¼ inches and an alternating current power source (SAC 600 manufactured by The Lincoln Electric Company) the maximum welding current at which a satisfactory flat weld bead could be obtained was approximately 400 amperes and the meltoff rate of the electrode was less than 20 pounds per hour. With a constant potential D.C. power source, such as the SAN 600 motor generator manufactured by The Lincoln Electric Company, the maximum meltoff rate at which a satisfactory flat weld bead could be obtained was 23 pounds per hour.

The present invention contemplates and has for its principal object a granular welding flux for use in the submerged arc welding of mild steels which enables the laying down of ideal weld beads at meltoff rates higher than ever heretofore thought possible.

Another object of the invention is the provision of a new and improved welding flux of the general type described which enables the laying down of a flat or slightly concave weld bead with the edges of the weld bead blending smoothly into the unmelted surfaces of the workpiece at meltoff rates, using alternating current power sources in excess of 30 pounds per hour.

Another object of the invention is the provision of a new and improved welding flux of the general type described which enables the laying down of flat to slightly concave weld beads with the edges thereof blending smoothly into the unmelted surfaces of the workpiece at meltoff rates in excess of 40 pounds per hour using direct current power sources.

Another object of the invention is the provision of a new and improved welding flux of the general type described which enables the deposition of satisfactory weld beads at all currents and all meltoff rates and with A.C. or D.C.

Without desiring to limit the scope of the present invention, it is believed that at least part of its success is based on the following analysis of what occurs in an electric arc between a rapidly advancing mild steel electrode electrically energized so as to be negative relative to a workpiece. A stream of electrons is continuously emitted from the metal forming the electrode tip surface and moves through the arc gap to the workpiece. In order for these electrons to be emitted, they must acquire sufficient energy to escape the potential barrier which normally holds them within the metal. Of the several means for the electrons to acquire such energy it is believed that the following explanation is the most reasonable: Thus, with an arc betwen the electrode tip and the workpiece, there is a layer of positively charged ions existing very close to the surface of the electrode tip which, because of their proximity to the tip (one to ten angstroms) and opposite electrical charge, form an electrostatic field of high potential gradient sufficient to accelerate the electrons through the potential barrier. The number of electrons that must be accelerated through the surface of the electrode tip, when the welding current is on the order of 400–500 amperes, is so high as to continuously disrupt this ionic layer. With an uncontaminated iron tip, the barrier potential and thus the voltage gradient is so high that the electrostatic field tends to concentrate at isolated points about the electrode tip and very large numbers of electrons are released from very small areas on the electrode tip. Current densities of astronomical values result which immediately raise a spot on the tip to the vaporization temperature of the metal and molten metal at or near the spot is blasted free and projected into the weld pool with sufficient force to disturb the molten metal in the weld pool. This phenomenon is referred to hereinafter as "sputtering." It occurs at all current values but its detrimental effects do not become noticeable (or objectionable) until with A.C. power sources an effort is made to increase the electrode meltoff rate above 15 (or 20) pounds per hour, or with low internal dynamic impedance D.C. power sources 20 (or 25) pounds per hour, or moderately high internal dynamic impedance D.C. power sources 25 (or 30) pounds per hour.

As welding currents are used to obtain higher meltoff rates, the effect of the sputtering is like repeatedly throwing a small stone into a pool of water. The ripples thus created move up onto the already hardening bead where they then themselves harden leaving a ridge with a convex surface down the length of the bead. This ridge, while possibly acceptable, contains excess or wasted metal.

As higher welding currents plus longer stickouts are used to obtain even higher meltoff rates, the adverse effects of this sputtering also increase. In such situations more of the metal at the electrode tip is at or close to the melting temperature of the metal and more molten metal may be blasted off by the sputtering effect above referred to.

It is like repeatedly throwing a larger boulder into the pool of water. The waves are much larger and the molten metal is piled up onto the already congealed weld bead where it then hardens leaving a large ridge down the middle of the weld bead which often has a totally unacceptable rope-like surface.

It was reasoned that if some material could be added to the flux which would contaminate the tip of the iron electrode with an element having an electronegative value on Pauling's scale, substantially less than that of iron, e.g., something less than 1.6–1.7, the potential barrier would be reduced sufficiently that the electrons, instead of being emitted from concentrated points on the electrode tip, would be continuously emitted over the entire surface of the electrode tip. If this could be accomplished, it was reasoned that the sputtering could be eliminated and it would be possible to obtain an ideal weld bead as above described.

Research work in the form of adding to existing granular fluxes (or substituting for oxides already in) oxides of elements having such low electronegative values confirmed such reasoning and higher deposition rates than ever thought possible (e.g., 50+ pounds per hour) have been easily obtained with a bead shape that was either flat or slightly concave.

Elements having an electronegative value less than 1.6–1.7 and thus within the scope of the invention, are the alkaline and alkali earth metals, aluminum, titanium, zirconium, scandium, hafnium, yttrium, the lanthanides and the actinides. These elements are hereinafter referred to jointly as "emitters" or "emission agents" and in accordance with the invention one or more must be present in the flux, usually but not necessarily in the oxide form.

The exact mechanism of lowering the barrier potential of the iron electrode surface is not known. However, it is believed that, since the barrier potential and emission of electrons is a surface phenomenon, the oxide (or the oxide partially reduced to the emitter metal by the heat of the arc) having a substantially lower barrier potential than the iron itself, coats the hot electrode surface with a monomolecular layer which serves as a source of electrons for the welding arc. The barrier potential in relation to the electrostatic field is sufficiently low that the electrons are emitted continuously from the whole surface of the electrode tip rather than from the points as heretofore discussed resulting in a quiet arc and a flat surfaced weld bead.

The emitters may be present in the flux in the elemental form although this is an expensive way of accomplishing the desired end result. Alternatively, and preferably, the emitters are present in the flux in the form of oxides, silicates, carbonates, or complex compounds, but if used in the form of compounds, the compounding elements must be such as to not destroy the emission function of the emitter. Thus in all instances tested, the oxide form is satisfactory. The oxide form is what may be referred to as a "polarized compound," that is to say the molecular arrangement is electrically unbalanced such that the metallic emitter atoms assume a position on the surface of the electrode tip where they can supply electrons to the arc plasma. On the other hand, calcium silicate is what may be referred to as an "unpolarized compound" wherein the atomic arrangement is such that the compounding elements surround the emitter atom and in effect shield it from the arc plasma. Potassium and sodium silicate on the other hand decompose in the heat of the arc to form a polarized oxide and silicon dioxide. As such both will function as an emitter.

A carbonate in some respects is the equivalent of an oxide because it breaks down in the heat of the arc to release carbon dioxide leaving the oxide to perform the emitting function.

Further research indicated that the presence of certain elements in the flux tended to destroy the ability of the emission agent to prevent sputtering. Analysis of this problem indicated that if elements were present in the flux which had much higher electronegative value than iron, then such elements tended to counteract the effect of the emission agent with the result that either the sputtering could not be eliminated or substantially greater amounts of the emission agent were required. Elements having such a high electronegative value are fluorine, chlorine, bromine, iodine, free oxygen and sulphur. These elements are hereinafter referred to jointly as "quenchers" or "quenching agents." The presence of these quenching agents in any amount other than is absolutely necessary for other purposes in the flux is contrary to the invention except insofar as their quenching effects are offset by additional amounts of emission agents. The presence of compounds containing these elements is just as detrimental to the present invention as the elements themselves if such compounds will decompose in the heat of the arc to release the element or if their melting temperature is sufficiently low that they melt and coat the electrode surface prior to its reaching the arcing tip and thus swamp the emission effect of the emission agent. Ores if used should be thoroughly roasted beforehand to drive off any available oxygen.

One of the most important requirements of a welding flux is that the freezing temperature of its slag must be below the freezing temperature of the steel. Thus, as an important part of the invention, all of the ingredients including the emitters above discussed and any other ingredients to be hereinafter discussed, must be so proportioned that when the flux is melted, the resultant mixture will have a freezing range appreciably below that of steel and preferably in the range of 1250° C. to 1350° C.

A further important requirement of the slag discovered as a result of the present invention is that it have the ability of conducting heat sidewardly from the arc plasma to not only the edges of the weld bead, but also to the portions of the workpiece immediately adjacent to these edges. To do this the molten flux must wet the surfaces of both the weld bead and the workpiece and must also be of a glassy nature, by which is meant that it must contain substantial amounts of a liquid which increases in viscosity as its temperature decreases until it becomes rigid. In accordance with the invention, this temperature is between 1250° C. to 1350° C. A flux that freezes principally as a polycrystalline material, as distinguished from a glassy material, does not transmit heat effectively because of the discontinuities in its physical structure caused by the individual crystals forming even though these crystals may be in face-to-face contact. On the other hand, the slag must not all be of a glassy nature but a principal proportion thereof should be. All of the ingredients in the flux, including the emitters and those ingredients hereinafter discussed, must in accordance with the invention be proportioned to provide a slag wherein at least a substantial proportion thereof is of a glassy nature. Whether a flux is glassy or polycrystalline may be determined either by petrographic examination, X-ray diffraction, microscopic or visual, the latter being done by examining a fracture of the hardened slag.

To meet the requirements of a slag with a glassy nature, glass forming materials must be present in the flux in a major proportion. Silicon dioxide is the principal glass forming substance known and as such is present in major proportions in all of the fluxes made in accordance with this invention. Further, the proportions of the emitter chosen must be such that while some freezes in the polycrystalline mode, a substantial portion becomes a glass modifier.

To obtain welds of satisfactory strength and ductility in the mild steel, it is usually necessary to add some manganese to the weld metal. While this may be done by adding manganese metal or alloys to the flux, manganese metal or alloys are expensive and it has been found that if manganese oxide is employed as one of the flux ingredients, that some manganese will migrate from the welding flux to the weld metal thus satisfying the manganese requirements of the weld metal. Consequently, fluxes manufactured in accordance with preferred embodiments of the invention usually include roasted manganese ores or manganese oxide. Manganese oxide has a further benefit to the welding flux of the invention because it has the ability to act as a glass modifier in combination with the silicon dioxide. Aluminum oxide is alitropic and may be used as an emitter or as a base ingredient to form a glassy slag with silicon dioxide.

On the question of the slag freezing temperature, the emission agents can be classified into two groups. One group is those that have electronegative values close to 1.6 and have to be present in the flux in large enough quantities that they influence the melting and freezing temperature of the slag. These are hereinafter referred to as Class I emission agents. The other group is those that have electronegative values substantially below 1.6 and can be present in the flux in small enough quantities that they have little or no effect on the melting temperatures of the slag. The emission agents are listed below according to the classes within which they fall.

Class I:
    Lithium
    Sodium
    Beryllium
    Magnesium
    Calcium
    Aluminum
    Scandium
    Yttrium
    Lanthanum and the lanthanides
    Actinium and the actinides
    Titanium
    Zirconium
    Hafnium Class II:
    Potassium
    Rubidium
    Cesium
    Strontium
    Barium The preferred oxides of Class I are those of magnesium, calcium, aluminum, titanium and zirconium. Beryllium is not considered because it is poisonous. Lithium and sodium cannot be used as the sole emitting agent or principal emitter because their oxides lower the melting point of the slag to the point where it becomes difficult to control. The remainder of Class I emitters are either too expensive or are radioactive and while they may have the desired electrical properties, are not preferred in accordance with the invention. It is to be noted that in all instances where these elements are employed as emitters they must be present in the flux in such form that they will coat the electrode as a polarized compound prior to the electrode entering the arc zone.

The Class II emitters are sufficiently strong emission agents that relatively small quantities will perform the desired emission function. If used they must be employed in such a way that they can coat the electrode as a polarized compound prior to the electrode entering the arc. Because of their strength they may be used to bolster a flux which because of formulating to the proper melting temperature characteristics has insufficient Class I emitters to eliminate sputtering.

Calcium fluoride has characteristics which assist the flux to melt in the heat of the arc and also assist the molten flux to wet the molten steel, thus improving the conduction of the heat from the arc plasma through the molten flux to the steel. Thus, calcium fluoride is normally always employed in fluxes in accordance with the present invention. Calcium is an emitter. Fluorine is a quencher and appears to overpower the emitting effects of the calcium. Therefore, the amounts of calcium fluoride employed in accordance with the invention are held to the absolute minimum which is in the neighborhood of 4–5%. Barium appears to be a better emitter than fluorine is a quencher so that barium fluoride is not detrimental. Calcium fluoride is cheaper and is thus employed.

The Class I emission agents, as above pointed out, must be present as a polarized compound. If previously reacted with silicon dioxide prior to being deposited on the workpiece, they will instead be an unpolarized compound. Thus, the emitters or compounds thereof must be present in the flux unreacted with the silicon dioxide. To this end and in accordance with the invention, all of the flux ingredients are ground to a fine powder, thoroughly mixed and then bound together in a uniformly distributed condition into granules of a preferred size to pass through a 16 and remain on a 100 mesh screen. While the powders of the flux ingredients may be bound into granules in this uniformly distributed condition by any suitable means, sodium silicate as a binder is preferred. In the manufacture, the thoroughly mixed powders of the ingredients are tumbled with a water solution of sodium silicate until dry and in such a manner that the resultant granule size is as desired. The temperature employed in this drying operation must be sufficient to dry the sodium silicate and drive out any other moisture from the flux, but not sufficient to melt the various flux ingredients to cause them to react one with the other. A temperature of 755° C. is preferred. A flux wherein the ingredients are so physically arranged is described in U.S. Patent No. 2,474,787 and assigned to the assignee of this application.

The form in which the ingredients exist in the flux of the present invention is to be distinguished from that where all the ingredients are placed in a kiln or the like, heated to a temperature above the melting temperature of some of the ingredients such that all the ingredients will melt and in the liquid form react with the other to form a complex compound which liquid compound is then allowed to harden and is then crushed to the desired granule size.

The present invention may take physical form in certain combinations and proportions of fluxing ingredients it being noted that it is primarily possible to tell when such combinations and proportions in accordance with the present invention are being used by an examination of the deposited weld bead itself, preferably taken in cross section and when the type of power source employed is known in combination with the electrode meltoff rate.

As a means of illustrating preferred combinations and proportions of welding ingredients and the type of weld bead produced by the present invention, reference is now made to the drawings wherein.

Figure 1:
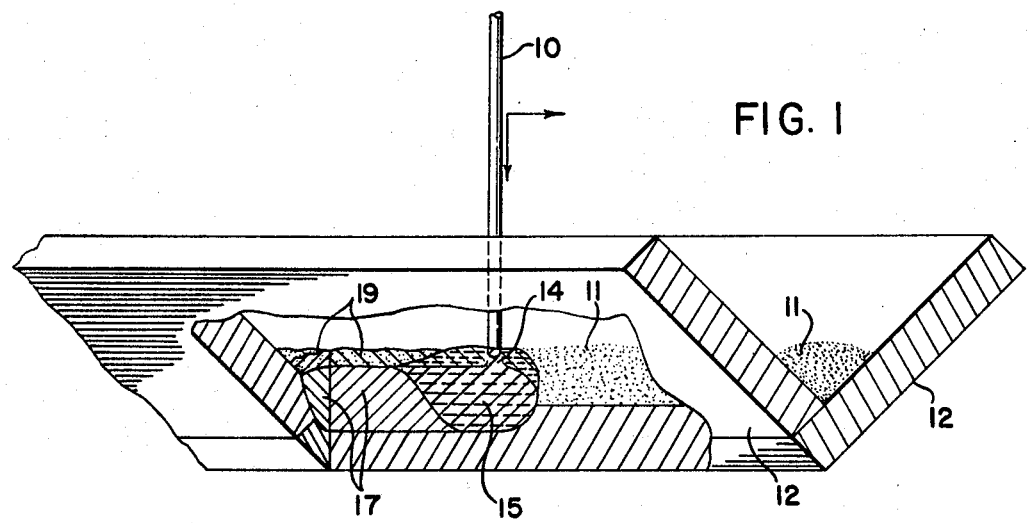
FIGURE 1 is a side cross-sectional view of a typical submerged arc type welding operation laying down a fillet weld.

Referring now to the drawings where the showings are for the purpose of better describing the invention, FIGURE 1 shows an electrically energized mild steel electrode 10 being advanced lengthwise through a pile of granular fluxing material 11 positioned on top of a pair of workpieces 12 positioned so that they present an upwardly facing 90° trough in which the weld bead is to be deposited and an arc 14 between the electrode end and a workpiece both melts a spot on the workpiece to form a pool of molten metal 15 and melts off the end of the electrode to provide a filler metal which mixes with this molten pool to form the weld bead 17 left behind as the electrode is simultaneously advanced sidewardly. The granular fluxing material exists as a heap 11 on the workpiece in front of the sidewardly advancing electrode and is melted and hardens as a slag 19 over the congealed weld bead 17.

It is possible to determine when a flux employing the present invention has been employed by first knowing the type of power source used to energize the electrode, secondly by knowing the meltoff rate of the electrode and thirdly and most important, by examining a transverse section of the weld bead itself.

Figure 2:
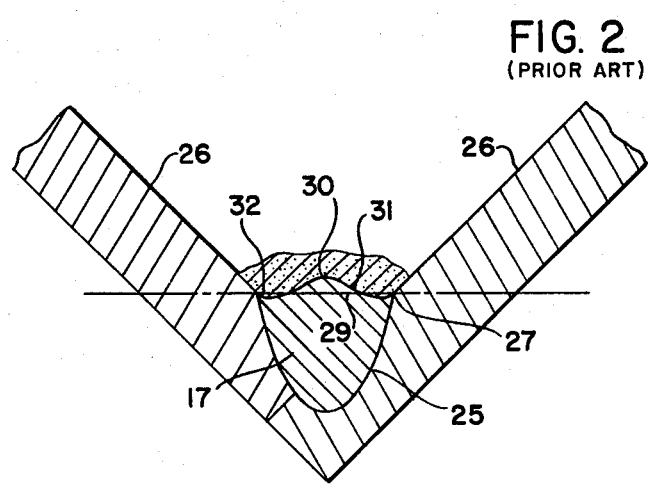
FIGURES 2 and 3 are cross-sectional views of a workpiece showing a weld of the type produced by the prior fluxes at meltoff rates in excess of their maximum metal handling ability.

The reason for the need to know the type of power source is that the bad effects of sputtering first become apparent as the welding current increases when the power source is of a type that the instantaneous currents can rise to relatively high values causing the explosive effect above described. With an alternating current power supply, the peak currents are always 1.4 times the R.M.S. current anyway so that as currents are increased to increase the meltoff rate, the bad effects of sputtering first become apparent with an alternating current power source. With a D.C. power source of lower internal dynamic impedance, the instantaneous current values can rise to very high values. This effect of the sputtering is clearly shown in FIGURE 2, which is an end cross-sectional view of FIGURE 1 showing how a welded workpiece would appear if sectioned, polished and etched as is conventional in the art. In the weld of FIGURE 2 there is a clear line of demarcation 25 between the unmelted portions of the workpiece 12 and the hardened weld bead 17 which line intersects the surfaces 26 of the workpiece 12 at the exact edges 27 of the weld bead. The surface of the weld bead is humped or convex in the middle as at 30 and slightly concave on both sides thereof as at 31. The edges blend smoothly into the surfaces 26 with a short curved radius 32. It is to be noted that the surface 30 extends above the plane 29 defined by the edges 27. All of the metal above this plane 29 contributes nothing to the ultimate strength of the weld bead and is thus wasted. If this same metal could be made to flow horizontally, a longer weld bead for the same amount of electrode metal deposited would result. A further characteristic of the bead is that the surface 30 has a series of V-shaped lines (not shown) or ridges with the apex pointing opposite to the direction of sideward movement of the electrode.

The weld bead cross section or worse, and by worse is meant rising further above the plane 29, shown in FIGURE 2 was obtained at all deposition rates in excess of 18 pounds per hour using the standard 760 welding flux and the standard SAC 600 alternating current power source manufactured by The Lincoln Electric Company, the assignee of this application.

The type of weld bead shown in FIGURE 2 is typical of welding fluxes having no or insufficient emitters as compared to the present invention.

Figure 3:
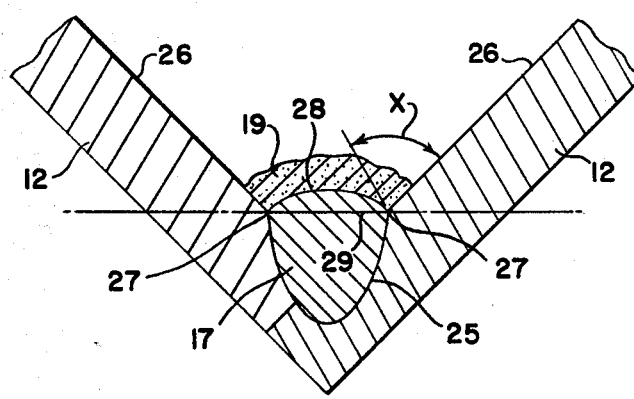

FIGURE 3 shows another shape of weld bead obtained with other types of prior art fluxes, e.g., the 780 welding flux manufactured by The Lincoln Electric Company. The weld bead has an upper exposed surface 28 which is clearly convex and intersects with the surfaces 26 at a definite angle x which has a rather sharp apex. This apex is a source of stress concentrations which can possibly lead to early fatigue failure of the weld bead. In the case of this weld, sputtering was not a problem but the flux froze as a polycrystalline mass and was thus unable to conduct the heat from the arc plasma outwardly to the workpiece immediately adjacent to the edges 27. This portion of the workpiece was in fact insufficiently heated for the molten weld metal to wet it. At the high meltoff rates to which this invention pertains, the beads have substantial width. Conduction of heat to the edges thereof and to the workpiece adjacent to these edges is important. The bead shape of FIGURE 3 is typical of bead shapes using the SAC 600 power source and deposition rates in excess of 20 pounds per hour.

Figure 4:
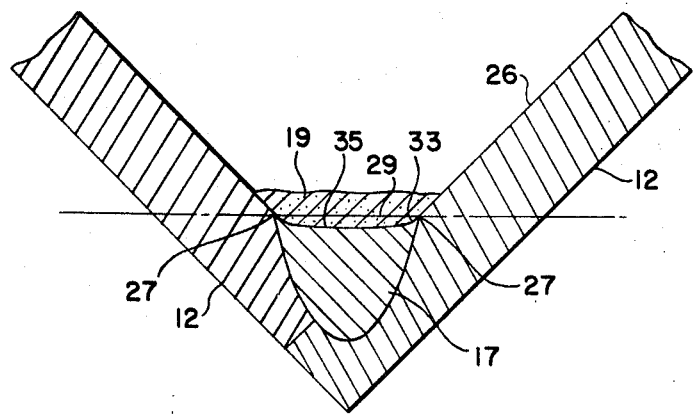
FIGURE 4 is a similar view showing a weld bead produced by the flux of the present invention under similar conditions.

FIGURE 4 shows a typical cross section of a weld bead obtainable using fluxes of the present invention at meltoff rates of 20 pounds per hour or more with an A.C. power source. In FIGURE 4 the surface 35 of the weld bead is essentially flat (possibly slightly concave) and at the edges are defined by a curved surface 33 of a short but clearly apparent radius so that the surface 35 may be said to blend or curve smoothly and tangentially into the surfaces 26. The absence of the sharp angle x of FIGURE 3 and the hump or ridge in the center of FIGURE 2 is to be noted.

Another way of describing the weld bead of FIGURE 4 is to say that it has a positive miniscus showing that the molten metal wetted and was attracted to the workpiece surface. This positive miniscus may be distinguished from the negative miniscus of FIGURE 3 or to the negative miniscus of mercury resting on a glass plate.

A comparison of the high meltoff rates obtainable using the present invention compared to the meltoff rates obtainable with prior art fluxes is as follows:

preferred embodiments the calcium fluoride and silico manganese are each present in four weight percent. These ingredients are thus present in total amounts of 20 to 26 percent.

Such ingredients in these general proportions are well known and as such form no part of the present invention except as used in combination with the other essential flux ingredients which make up the balance and will now be described.

Of the essential flux ingredients, considerable experimentation has indicated that the flux must contain at least three essential flux ingredients and that only a very narrow range of portions of these essential flux ingredients will produce the weld bead of the shape shown in FIGURE 4 at meltoff rates as set forth in the above table.

The preferred emitter oxides are those of magnesium, calcium, titanium and aluminum. Tests have indicated that no proportion of three essential flux ingredients wherein an oxide of zirconium is the sole emitter will function because of too high a melting temperature of the slag. Zirconium oxide may be substituted for the other preferred emitter oxides up to 65% thereof in effect making a flux containing four essential ingredients.

Figure 5:
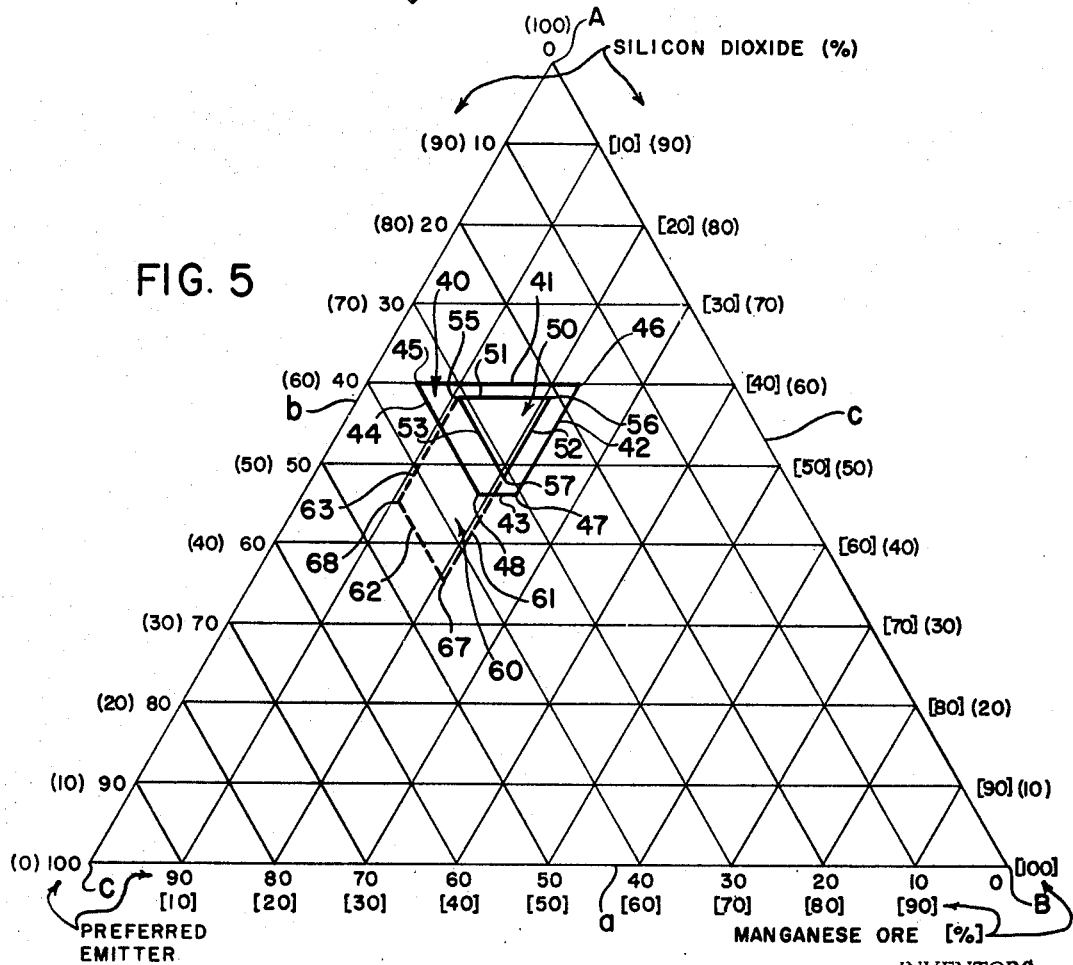
FIGURE 5 is a triangular coordinate graph showing the range of proportions of the essential ingredients coming within the scope of the invention as well as the range of the preferred embodiments.

This narrow range of proportions of the preferred emitter oxides is best described by using the triangular coordinate system of FIGURE 5 wherein the sides b and c from apex A show the variations of $SiO_2$ from 100% to zero, sides a and b from apex C show the variations of roasted manganese ore from 100% to zero and sides a and c from apex B show the variations from 100% to zero of the oxides of the preferred emitters, namely, magnesium, calcium, titanium and aluminum.

Shown in the center of this graph is an area 40 defined by sides 41, 42, 43 and 44 and so long as the proportions of silicon dioxide, manganese oxide and one or more oxides of calcium, magnesium, titanium and alumi-

| Power Source | Internal Dynamic Impedance | Flux 780 [1] | Flux 760 [1] | New Flux |
|---|---|---|---|---|
| SAC 600 [1] | Low | 18 | 19 | 32 |
| SAE 600 [1] | Medium | 23 | 25 | 33 |
| SAN 600 [1] | Low | 23 | 23 | [2] 35 |
| SA 750 [1] | Moderately high | 26 | 28 | 42 |
| SAF 600 [1] | do | 28 | 32 | 36 |
| D.C. Experimental 3-Phase Rectified A.C. | Very high | 32 | 45 | [3] 70 |

[1] Manufactured and commercially available from The Lincoln Electric Company. Tests on fluxes of competing manufacturers gave no better results than the 760 and 780 flux and thus are not tabulated.
[2] Not maximum but maximum obtainable at maximum current rating of power source.
[3] Not maximum but maximum wire feed speed of wire feed mechanism on ⁹⁄₆₄ inch electrode.

Above these maximum amounts with the new flux, the bead surface becomes rough due to large droplets of metal being transferred which tend to instantaneously short out the arc and explode like a fuse, the effect of which is aggravated by low internal impedance power sources.

The fluxes of the present invention contain what may be termed as auxiliary flux ingredients and essential flux ingredients. The auxiliary flux ingredients consist of a wetting agent in the form of calcium fluoride, one or more killing or alloying agents in metallic form such as silicon, manganese, titanium, boron, aluminum or the like and a binder such as sodium or potassium silicate. These auxiliary ingredients are present in all fluxes of the present invention in the following general proportions in weight percent: calcium fluoride, 4–6 percent, silicon manganese, 4–6 percent and sodium silicate, 12–14 percent. In all the num fall within this area 40, such proportions come within the scope of the present invention.

Shown within the area 40 is a smaller area 50 defined by sides 51, 52 and 53 which area defines the preferred proportions of silicon dioxide, manganese oxide and one or more oxides of calcium, magnesium and titanium. The area 50 plus the area 60 which is defined by sides 53, 51, 62 and 63 defines the preferred proportions when aluminum oxide is employed as the emitter.

The area 40 is defined by cordinates 45, 46, 47 and 48. The area 50 is defined by coordinates 55, 56 and 57. The areas 50 plus 60 are defined by coordinates 55, 56, 67 and 68.

Each coordinate point is defined by the following amounts of silicon dioxide, manganese oxide and preferred emitter oxide respectively as follows:

| Coordinate | $SiO_2$ | MnO | Preferred Emitter Oxides | Coordinate | $SiO_2$ | MnO | $Al_2O_3$ |
|---|---|---|---|---|---|---|---|
| 45 | 60 | +5 | 35 | 67 | 35 | 21 | 44 |
| 46 | 60 | 23 | 17 | 68 | 45 | 11 | 44 |
| 47 | 46 | 23 | 31 | | | | |
| 48 | 46 | 19 | 35 | | | | |
| 55 | 58 | 11 | 31 | | | | |
| 56 | 58 | 21 | 21 | | | | |
| 57 | 48 | 21 | 31 | | | | |

These areas 40, 50 and 60 were all determined by running a series of tests on various proportions of the essential flux ingredients and then examining the weld bead for the concavity or convexness of its surface and as to whether or not the edges of the weld bead blended smoothly and tangentially into the workpiece surfaces.

While calcium oxide is a preferred emitter, it is also to be noted that it is hydroscopic and if employed in the flux of the present invention, should be first calcined at temperatures above 3000° C. This is an expensive operation and therefore if calcium is to be used as an emission agent, it is preferred that it be in the form of calcium silicate ($CaO \cdot SiO_2$) but only in amounts up to 65% of the total emitter oxide with the balance being made up of one of the preferred emitter oxides.

As above pointed out, zirconium oxide, while not a preferred emitter, may be substituted for the preferred emitters up to a total amount of 65%. The same is true of calcium silicate.

The flux of the present invention has a characteristic which has heretofore been avoided in the prior art fluxes, namely, that of what is called "flash through" wherein even though the arc is below a molten pool of flux, there are flashes which continuously appear on the outside of the flux making it necessary for the welding operator to wear a shield over his eyes.

MnO and manganese oxide as used herein is a manganese ore containing 88% MnO. The balance is made up of impurities consisting usually of oxides principally of aluminum, silicon and iron. The manganese ores as mined also usually always contain fairly large amounts of available oxygen which would be released in the heat of the art and in accordance with the invention, all manganese ores before being added to the other flux ingredients should be fully calcined so they contain less than 2% available oxygen. Any other ores should likewise be calcined.

It is to be further noted that when flux of the present invention is to be used with an alternating current power supply, approximately two parts by weight of a Class II emission agent should be added to the flux.

The sodium silicate binder employed in the preferred embodiment is commercially available and has the formula $Na_2O + 2.8\ SiO_2$.

Test work has indicated that there are certain other proportions of essential flux ingredients which will perform in accordance with the invention within such extremely narrow ranges that it is difficult to show them on a triangular coordinate chart. Accordingly, the proportions of the essential flux ingredients illustrating other embodiments of the invention which will work are as follows:

| | | | | |
|---|---|---|---|---|
| $SiO_2$ | 52 | 70 | 35 | 40 |
| MGO | 29 | | | |
| $Al_2O_3$ | 19 | | | 33 |
| $TiO_2$ | | 15 | | 26 |
| $ZrO_2$ | | 15 | 34 | |
| $CaSiO_3$ | | | 30 | |

For systems containing manganese oxide and silicon dioxide as two of the essential flux ingredients, the following may illustrate preferred embodiments.

| | I | II | III | IV | V | VI | VII | VIII | IX |
|---|---|---|---|---|---|---|---|---|---|
| $SiO_2$ | 52 | 56 | 4.6 | 50 | 52.5 | 52 | 52 | 35 | 40 |
| MnO | 20 | 21.5 | 17.5 | 19 | 20 | 20 | 19.5 | 20 | 20 |
| $Al_2O_3$ | | | | | | | 14.2 | 45 | 40 |
| MgO | 28 | 22.5 | | | 14.5 | 14 | 14.3 | | |
| $TiO_2$ | | | | 30 | | | | | |
| $MgSiO_3$[1] | | | 78 | | | | 14 | | |
| $CaSiO_3$[2] | | | | | | 14.5 | | | |

[1] Breaks down in heat of the arc into 22 parts $MgO + 45$ parts $SiO_2$.
[2] Does not break down in the heat of the arc.

All of the various flux ingredients mentioned herein above have so far as we know previously been employed in welding fluxes, and the invention herein is not broadly in the use of such ingredients but in using: (a) more of certain ingredients containing as an element therein one or more of the emitters in combination with (b) holding down to a minimum the compounds containing one or more of the quenching agents hereinabove referred to and (c) in holding the proportion of the essential ingredients in a very limited range of proportions such that a primarily glassy partly polycrystalline slag results having the proper hardening temperature.

Many of the various flux ingredients referred to herein above are purchased as ores and as such may contain various amounts of contaminants, impurities or residues which are often unavoidable except at great expense. If their presence does not adversely affect the ideal weld bead shape, they will not remove a flux otherwise within the scope of the invention from the scope of the claims hereinafter set forth.

Having thus described our invention, we claim:

1. In a granular flux composition of the type to be deposited on a steel workpiece and to have a bare consumable steel electrode advanced therethrough with an electric arc between the electrode and the workpiece to both melt the workpiece and the flux composition, said flux being in the form of a plurality of free-flowing granules consisting essentially of a plurality of finely ground ingredients held in uniformly distributed condition throughout all the granules by a binder;

said ingredients consisting of 20–26 weight percent of a plurality of auxiliary ingredients and at least three essential ingredients making up the balance;

said auxiliary ingredients consisting of calcium fluoride, 4–6 weight percent; one or more killing agent metals selected from the class consisting of silicon, manganese, boron, titanium and aluminum, 4–6 weight percent; and a binder selected from the class consisting of sodium silicate and potassium silicate, 10–15 weight percent;

the improvement which comprises said essential ingredients consisting of silicon dioxide, manganese oxide and one or more emitters selected from the class consisting of the oxides of magnesium, calcium, aluminum and titanium, said essential ingredients being present in amounts such as to fall within an area on a triangular coordinate graph defined by the following coordinates:

| | $SiO_2$ | MnO | Emitter Oxides |
|---|---|---|---|
| Coordinate: | | | |
| a | 60 | 5 | 35 |
| b | 60 | 23 | 17 |
| c | 46 | 23 | 31 |
| d | 46 | 19 | 35 |

2. The improvement of claim 1 wherein said coordinates are as follows:

| | $SiO_2$ | MnO | Emitter Oxides |
|---|---|---|---|
| Coordinate: | | | |
| d | 58 | 11 | 31 |
| e | 58 | 21 | 21 |
| f | 48 | 21 | 31 |

3. The improvement of claim 1 wherein when $Al_2O_3$ is the emitter oxide the coordinates are as follows:

| | $SiO_2$ | MnO | $Al_2O_3$ |
|---|---|---|---|
| Coordinate: | | | |
| d | 58 | 11 | 31 |
| e | 58 | 21 | 21 |
| g | 35 | 21 | 44 |
| h | 45 | 11 | 44 |

4. The improvement of claim 1 wherein said essential ingredients have the following approximate parts-by-weight ratio $SiO_2$, 40; MnO, 15.3; MgO, 51.8–21.8.

5. The improvement of claim 1 wherein said essential ingredients have the following approximate parts-by-weight ratio: $SiO_2$, 40; MnO, 15.3; MgO, 11; $Al_2O_3$, 11.

6. The improvement of claim 1 wherein said essential ingredients have the following approximate parts-by-weight ratio: $SiO_2$, 4; MnO, 15; $MgSiO_3$, 67.

7. The improvement of claim 1 wherein said essential ingredients have the following approximate parts-by-weight ratio: $SiO_2$, 35; MnO, 20; $Al_2O_3$, 40–45.

8. A flux composition adapted to being deposited in a pile on a mild steel workpiece and to have a bare consumable steel electrode advanced therethrough while maintaining an arc between the end of the electrode and the workpiece to melt a spot on the workpiece and the flux, said flux being in the form of a plurality of free-flowing granules consisting essentially of a plurality of finely ground ingredients held in uniformly distributed condition throughout all the granules by a binder;

said ingredients consisting of 20–26 weight percent of a plurality of auxiliary ingredients and a plurality of essential ingredients making up the balance;

said auxiliary ingredients consisting of:
 calcium fluoride, 4–6 weight percent;
 one or more killing agent metals selected from the class comprised of silicon, manganese, boron, titanium and aluminum, 4–6 weight percent; and,
 a binder selected from the class consisting of sodium silicate and potassium silicate, 10–15 weight percent, the improvement which comprises:
 said essential ingredients consisting of:
  silicon dioxide in amounts of 46 to 60 percent of the total amount of essential ingredients the balance being one or more oxides of emitter agents selected from the class consisting of magnesium, aluminum, titanium, zirconium and calcium;
 such ingredients being so relatively proportioned that the slag from such flux:
  has a freezing temperature of between 1250° and 1350° C.;
  hardens as a mixture of a glassy and polycrystalline material; and,
  when welding with a mild steel electrode, and deposition rates in excess of 20 pounds per hour using an alternating current power source, the resulting weld bead has a relatively flat surface with the edges thereof blending tangentially into the surfaces of the workpiece.

9. The improvement of claim 8 wherein said essential ingredients have the following approximate weight percent of the total flux weight: $SiO_2$, 40; MgO, 22; $Al_2O_3$, 15.

10. The improvement of claim 8 wherein said essential ingredients have the following approximate weight percent of the total flux weight: $SiO_2$, 35; $ZrO_2$, 34; $CaSiO_3$, 30.

11. The improvement of claim 8 wherein said ingredients also include manganese oxide.

References Cited

UNITED STATES PATENTS

| | | | |
|---|---|---|---|
| 2,435,852 | 3/1948 | Stringham | 148—26 |
| 2,474,787 | 6/1949 | Landis et al. | 148—26 |
| 2,681,875 | 6/1954 | Stringham et al. | 148—23 |
| 2,719,801 | 10/1955 | Stringham et al. | 148—26 |
| 3,078,193 | 2/1963 | Jackson | 148—26 |
| 3,200,016 | 8/1956 | Sharav et al. | 148—26 |

HYLAND BIZOT, *Primary Examiner.*

DAVIL L. RECK, *Examiner.*

H. SAITO, W. STALLARD, *Assistant Examiner.*

UNITED STATES PATENT OFFICE
CERTIFICATE OF CORRECTION

Patent No. 3,393,102                          July 16, 1968

John E. Carroll et al.

It is certified that error appears in the above identified patent and that said Letters Patent are hereby corrected as shown below:

Column 12, line 68,    "MgO, 15.8-21.8." should read -- MgO, 51.8-21.8. --.

Signed and sealed this 9th day of December 1969.

SEAL)
Attest:

Edward M. Fletcher, Jr.                      WILLIAM E. SCHUYLER, JR.
Attesting Officer                                   Commissioner of Patents